US011986906B2

United States Patent
Wu et al.

(10) Patent No.: US 11,986,906 B2
(45) Date of Patent: May 21, 2024

(54) DIE-CUTTING DEVICE

(71) Applicant: CONTEMPORARY AMPEREX TECHNOLOGY CO., LIMITED, Ningde (CN)

(72) Inventors: Tiefeng Wu, Ningde (CN); Xiangqiang Huang, Ningde (CN); Ruchu Yu, Ningde (CN); Zhiyong Deng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/324,430

(22) Filed: May 26, 2023

(65) Prior Publication Data
US 2023/0294211 A1    Sep. 21, 2023

Related U.S. Application Data

(63) Continuation of application No. PCT/CN2022/097941, filed on Jun. 9, 2022.

(30) Foreign Application Priority Data

Sep. 30, 2021   (CN) .......................... 202122410066.6

(51) Int. Cl.
*B23K 26/38*     (2014.01)
*H01M 10/04*    (2006.01)

(52) U.S. Cl.
CPC ......... *B23K 26/38* (2013.01); *H01M 10/0404* (2013.01)

(58) Field of Classification Search
CPC .......... H01M 10/0525; H01M 10/0404; B23K 26/38
(Continued)

(56) References Cited

U.S. PATENT DOCUMENTS 5,763,852 A * 6/1998 Brolund ................. B23K 10/00
                                                           219/121.58
11,673,209 B2 * 6/2023 Umehara .............. H01M 50/46
                                                           219/121.72
(Continued)

FOREIGN PATENT DOCUMENTS

CN         207743324 U     8/2018
CN         208033919 U     11/2018
(Continued)

OTHER PUBLICATIONS

The World Intellectual Property Organization (WIPO) International Search Report and Written opinion for PCT/CN2022/097941 dated Jul. 27, 2022 20 pages (including English translation).

(Continued)

*Primary Examiner* — Jimmy Chou
(74) *Attorney, Agent, or Firm* — ANOVA LAW GROUP, PLLC

(57) ABSTRACT

A die-cutting device includes a conveying mechanism configured to convey an electrode plate including uncoated and coated regions connected to each other, a cutting mechanism located on one side of the electrode plate in a thickness direction and configured to cut the uncoated region to form a scrap portion and a tab connected to the coated region, a first limiting member located between the electrode plate and the cutting mechanism in the thickness direction and provided with a cutting hole that allows laser light from the cutting mechanism to pass through and matches a cutting trajectory of the laser light, and a second limiting member located on a side of the electrode plate facing away from the first limiting member in the thickness direction and configured to cooperate with the first limiting member to limit the electrode plate in the thickness direction.

14 Claims, 8 Drawing Sheets

(58) Field of Classification Search
USPC .................................................. 219/121.67
See application file for complete search history.

(56) References Cited

U.S. PATENT DOCUMENTS

| | | | | |
|---|---|---|---|---|
| 2004/0104203 | A1* | 6/2004 | Yamaguchi | B23K 5/22 |
| | | | | 219/121.36 |
| 2008/0179304 | A1* | 7/2008 | Osako | B23K 26/0846 |
| | | | | 219/121.85 |
| 2010/0102044 | A1* | 4/2010 | Takizawa | B23K 26/14 |
| | | | | 219/121.72 |
| 2010/0206859 | A1* | 8/2010 | Nakai | B23K 26/08 |
| | | | | 219/121.72 |
| 2011/0019278 | A1* | 1/2011 | Aoki | H05K 9/0096 |
| | | | | 359/585 |
| 2012/0132697 | A1* | 5/2012 | Yano | B29C 65/7847 |
| | | | | 228/49.5 |
| 2013/0298387 | A1* | 11/2013 | Kobier | B23K 26/40 |
| | | | | 219/121.72 |
| 2015/0129107 | A1* | 5/2015 | Miyazaki | B32B 38/1841 |
| | | | | 156/522 |
| 2016/0263705 | A1* | 9/2016 | Kim | B23K 26/042 |
| 2019/0198860 | A1* | 6/2019 | Nishio | H01M 4/70 |
| 2020/0223202 | A1* | 7/2020 | Shintani | B32B 37/0053 |
| 2020/0276670 | A1* | 9/2020 | Watanabe | B23K 26/08 |
| 2020/0406401 | A1* | 12/2020 | Breuer | H01M 4/75 |
| 2021/0367232 | A1* | 11/2021 | Park | H01M 10/052 |
| 2023/0088137 | A1* | 3/2023 | Kumazawa | B23K 26/0838 |
| | | | | 219/121.67 |

FOREIGN PATENT DOCUMENTS

| | | | | |
|---|---|---|---|---|
| CN | 110556508 | A | | 12/2019 |
| CN | 212043165 | U | * | 12/2020 |
| CN | 212043165 | U | | 12/2020 |
| CN | 213410821 | U | | 6/2021 |
| CN | 215880388 | U | | 2/2022 |
| KR | 20160109384 | A | | 9/2016 |
| WO | WO-2015065105 | A1 | * | 5/2015 ........... B23K 26/042 |
| WO | WO-2021182515 | A1 | * | 9/2021 ......... B23K 26/0622 |

OTHER PUBLICATIONS

The China National Intellectual Property Administration (CNIPA) The Notice of Grant of Utility Model Patent Rights for Chinese Application 202122410066.6 dated Dec. 28, 2021 2 Pages (With Translation).

* cited by examiner

DIE-CUTTING DEVICE

CROSS-REFERENCE TO RELATED APPLICATIONS

The present application is a continuation of International Application No. PCT/CN2022/097941, filed on Jun. 9, 2022, which claims priority to Chinese patent application no. 202122410066.6, filed on Sep. 30, 2021 and entitled "DIE-CUTTING DEVICE", which are incorporated herein by reference in their entirety.

TECHNICAL FIELD

The present application relates to the technical field of battery manufacturing, and in particular to a die-cutting device.

BACKGROUND ART

At present, lithium batteries are widely used in electronic products, vehicles, aerospace and other fields. The increasingly complex application environments and conditions put forward higher requirements for the batteries in terms of safety performance, energy density, production cost, etc.

The forming quality of electrode plates of the lithium-ion batteries has a great influence on the batteries in terms of safety performance, energy density, production cost, etc. Thus, how to improve the forming quality of the electrode plates has become an urgent problem to be solved in a battery manufacturing process.

SUMMARY

According to the embodiments of the present application, a die-cutting device is provided to improve the forming quality of an electrode plate.

In a first aspect, according to an embodiment of the present application, a die-cutting device is provided, comprising a conveying mechanism, a first cutting mechanism, a first limiting member and a second limiting member. The conveying mechanism is configured to convey an electrode plate that comprises an uncoated region and a coated region, the uncoated region being connected to the coated region. The first cutting mechanism is located on one side of the electrode plate in a thickness direction, and the first cutting mechanism is configured to cut the uncoated region such that the uncoated region forms a scrap portion connected to the coated region and a tab connected to the coated region and separated from the scrap portion. The first limiting member is located between the electrode plate and the first cutting mechanism in the thickness direction, and the first limiting member is provided with a cutting hole that allows laser light emitted by the first cutting mechanism to pass through, the cutting hole matching a cutting trajectory of the laser light. The second limiting member is located on the side of the electrode plate that faces away from the first limiting member in the thickness direction, and the second limiting member is configured to cooperate with the first limiting member to limit the electrode plate in the thickness direction.

In the above technical solution, during the process of cutting the electrode plate to form the tab, both a conveying force of the conveying mechanism and a cutting force of the cutting mechanism may cause the electrode plate to jitter in the thickness direction, resulting in unstable cutting to affect the cutting quality of the tab, and an excessive jitter amplitude of the electrode plate may also cause the electrode plate to be out of a cutting range of the cutting mechanism, resulting in incomplete cutting or inability to achieve cutting. The first limiting member and the second limiting member are respectively provided on the two sides of the electrode plate and respectively limit the electrode plate on the two sides of the electrode plate in the thickness direction, so as to cooperatively limit the range of jitter of the electrode plate in the thickness direction to improve the cutting stability, thereby improving the forming quality of the electrode plate. The first limiting member is located between the electrode plate and the first cutting mechanism in the thickness direction of the electrode plate, and the cutting hole is provided to allow the laser light emitted by the first cutting mechanism to pass through, so as to cut the electrode plate and prevent the laser light from cutting the first limiting member.

In some embodiments in the first aspect of the present application, the first limiting member and the second limiting member at least partially overlap in the thickness direction to form an overlapping region, and the first cutting mechanism is configured to cut the uncoated region in the overlapping region.

In the above technical solution, the first cutting mechanism cuts the uncoated region in the overlapping region formed by the first limiting member and the second limiting member, and thus the two sides of the electrode plate in the thickness direction corresponding to the cutting region of the first cutting mechanism are both limited, which can limit the range of jitter of the electrode plate in the thickness direction and can limit the jitter degree of the electrode plate in the thickness direction of the electrode plate within the cutting range of the first cutting mechanism, so that the cutting stability can be improved.

In some embodiments in the first aspect of the present application, the first limiting member comprises a first rolling body configured to abut against the uncoated region.

In the above technical solution, the jitter of the electrode plate in the thickness direction may cause the uncoated region of the electrode plate to abut against the first limiting member, and the first rolling body of the first limiting member abuts against the uncoated region, so that the uncoated region is in rolling frictional contact with the first limiting member, and the uncoated region has small friction damping, thereby improving the transmission stability of the electrode plate and reducing the abrasion of the electrode plate, so as to effectively prevent tearing of the tab, even serious consequences such as strip breakage, due to large damping between the tab and the first limiting member after the tab is separated from the scrap portion.

In some embodiments in the first aspect of the present application, the first rolling body is disposed downstream of the first cutting mechanism.

In the above technical solution, since the scrap portion and the tab do not restrict each other after the scrap portion is separated from the tab, the tab and the scrap portion are both easily stuck with the first limiting member when they are in contact with the first limiting member. Thus, the first rolling body is disposed downstream of the first cutting mechanism, so that the separated tab and the scrap portion may both be in rolling fit with the first limiting member, so as to reduce the risk of tearing of the tab and strip breakage caused by the tab and the scrap portion being stuck with the first limiting member.

In some embodiments in the first aspect of the present application, the first limiting member further comprises a first limiting portion and a first connecting portion, the first rolling body being mounted on the first connecting portion, and the surface of the first limiting member that faces the electrode plate being flush with the edge of the first rolling body that is configured to abut against the uncoated region.

In the above technical solution, the surface of the first limiting portion that faces the electrode plate is flush with the edge of the first rolling body that is configured to abut against the uncoated region, and then the first limiting portion and the first rolling body have the same distance from the electrode plate to allow the electrode plate to have the same range of jitter in the thickness direction, thereby improving the cutting stability and reducing the risk of large deformation of the electrode plate so as to improve the forming quality of the electrode plate.

In some embodiments in the first aspect of the present application, the die-cutting device further comprises: a second cutting mechanism and a guide mechanism. The second cutting mechanism is disposed on one side of the electrode plate in the thickness direction, the second cutting mechanism is disposed downstream of the first cutting mechanism, and the second cutting mechanism is configured to cut the scrap portion to separate the scrap portion from the coated region. The guide mechanism is disposed downstream of the first limiting member, and the guide mechanism is configured to drive the scrap portion to offset towards the second cutting mechanism.

In the above technical solution, the electrode plate is formed in two steps by the first cutting mechanism and the second cutting mechanism. In the first step, the tab is separated from the scrap portion, so that during the cutting operation, the jitter of the scrap portion has little influence on the tab, so as to greatly reduce the risk of decrease of product qualification rate due to the deformation of the tab caused by the jitter of the scrap portion and the damage of the tab caused by being pulled by the scrap portion, and also improve the forming quality of the electrode plate. After the scrap portion is separated from the tab, the scrap portion is cut to separate the scrap portion from the coated region, so that the cutting of the electrode plate is completed. The guide mechanism drives the scrap portion to offset towards the second cutting mechanism to compensate for the deformation of the electrode plate during the cutting process of the first cutting mechanism, so that the scrap portion offsets to be within the cutting range of the second cutting mechanism to ensure that the second cutting mechanism can effectively cut the electrode plate.

In some embodiments in the first aspect of the present application, the guide mechanism is an adsorption mechanism, and the guide mechanism is located on the same side as the second cutting mechanism in the thickness direction.

In the above technical solution, the guide mechanism is the adsorption mechanism, and the uncoated region is driven by adsorption to offset towards the second cutting mechanism, so that the offset amount of the scrap portion can be controlled more accurately.

In some embodiments in the first aspect of the present application, the adsorption mechanism comprises an adsorption face provided with a plurality of adsorption holes.

In the above technical solution, providing the adsorption holes can improve the adsorption stability, thereby effectively improving the cutting stability of the scrap portion.

In some embodiments in the first aspect of the present application, the guide mechanism is located on the same side as the first limiting member in the thickness direction; and the second limiting member comprises second rolling bodies configured to abut against the uncoated region.

In the above technical solution, the guide mechanism and the first limiting member are located on the same side of the electrode plate in the thickness direction, the uncoated region may abut against the second limiting member due to the jitter of the electrode plate in the thickness direction, and the second rolling bodies of the second limiting member abut against the uncoated region, so that the uncoated region is in rolling frictional contact with the second limiting member, and the uncoated region has small friction damping, thereby improving the transmission stability of the electrode plate and reducing the abrasion of the electrode plate, so as to effectively prevent tearing of the tab, even serious consequences such as strip breakage, due to large damping between the tab and the second limiting member after the tab is separated from the scrap portion.

In some embodiments in the first aspect of the present application, a plurality of second rolling bodies are provided and located downstream of the first cutting mechanism, some of the plurality of second rolling bodies being located upstream of the second cutting mechanism, and some of the plurality of second rolling bodies being located downstream of the second cutting mechanism.

In the above technical solution, some of the second rolling bodies are disposed upstream of the second cutting mechanism, and some are disposed downstream of the second cutting mechanism, so that the scrap portion can be in rolling contact with the second limiting member before and after being separated from the coated region, so as to reduce the resistance of the electrode plate during the transmission process, improve the transmission stability of the electrode plate, and reduce the abrasion of the electrode plate.

In some embodiments in the first aspect of the present application, the second limiting member further comprises a second limiting portion and a second connecting portion, the second rolling bodies being mounted on the second connecting portion, and the surface of the second limiting portion that faces the electrode plate being flush with the edges of the second rolling bodies that are configured to abut against the scrap portion.

In the above technical solution, the surface of the second limiting portion that faces the electrode plate is flush with the edges of the second rolling bodies that are configured to abut against the uncoated region, and then the second limiting portion and the second rolling bodies have the same distance from the electrode plate to allow the electrode plate to have the same range of jitter in the thickness direction, thereby improving the cutting stability and reducing the risk of large deformation of the electrode plate so as to improve the forming quality of the electrode plate.

In some embodiments in the first aspect of the present application, the die-cutting device further comprises a third limiting member disposed on one side of the coated region in the thickness direction and configured to limit the coated region in an offset direction of the scrap portion.

In the above technical solution, since the scrap portion will make the coated region offset to cause deformation of the electrode plate during the process of the guide mechanism driving the scrap portion to offset towards the second cutting mechanism, the coated region is limited by the third limiting member in the offset direction of the scrap portion, so that the maximum deformation of the electrode plate can be limited so as to improve the forming quality of the electrode plate.

In some embodiments in the first aspect of the present application, the third limiting member is provided with a plurality of through holes.

In the above technical solution, the third limiting member is provided with the plurality of through holes, so that dust is not easy to accumulate on the third limiting member, and providing the through holes can also reduce the weight of the third limiting member.

In some embodiments in the first aspect of the present application, the die-cutting device further comprises a dust removal mechanism configured to remove dust generated on the electrode plate when the second cutting mechanism cuts the scrap portion of the electrode plate.

In the above technical solution, a coating of part of the coated region will be generally cut during the process of separating the scrap portion from the coated region, and a lot of dust will be generated when the coating is cut. The dust removal mechanism is configured to remove dust generated on the electrode plate when the second cutting mechanism cuts the scrap portion of the electrode plate, so as to maintain a clean cutting environment and avoid the influence of dust on the cutting operation of the second cutting mechanism, which is conducive to improving the forming quality of the electrode plate.

In some embodiments in the first aspect of the present application, the conveying mechanism comprises a first transmission roller and a second transmission roller which cooperate to convey the electrode plate, and the first limiting member and the second limiting member are both located between the first transmission roller and the second transmission roller in a conveying direction of the electrode plate.

In the above technical solution, the first transmission roller and the second transmission roller cooperate to convey the electrode plate, so that the convey stability can be improved so as to improve the cutting stability and the forming quality of the electrode plate.

BRIEF DESCRIPTION OF THE DRAWINGS

In order to more clearly describe the technical solutions of the embodiments of the present application, the accompanying drawings required in the embodiments will be described briefly below. It should be understood that the following accompanying drawings illustrate only some embodiments of the present application and therefore should not be construed as a limitation on the scope thereof. For those of ordinary skill in the art, other relevant accompanying drawings can also be obtained from these accompanying drawings without any creative effort.

Figure 1:
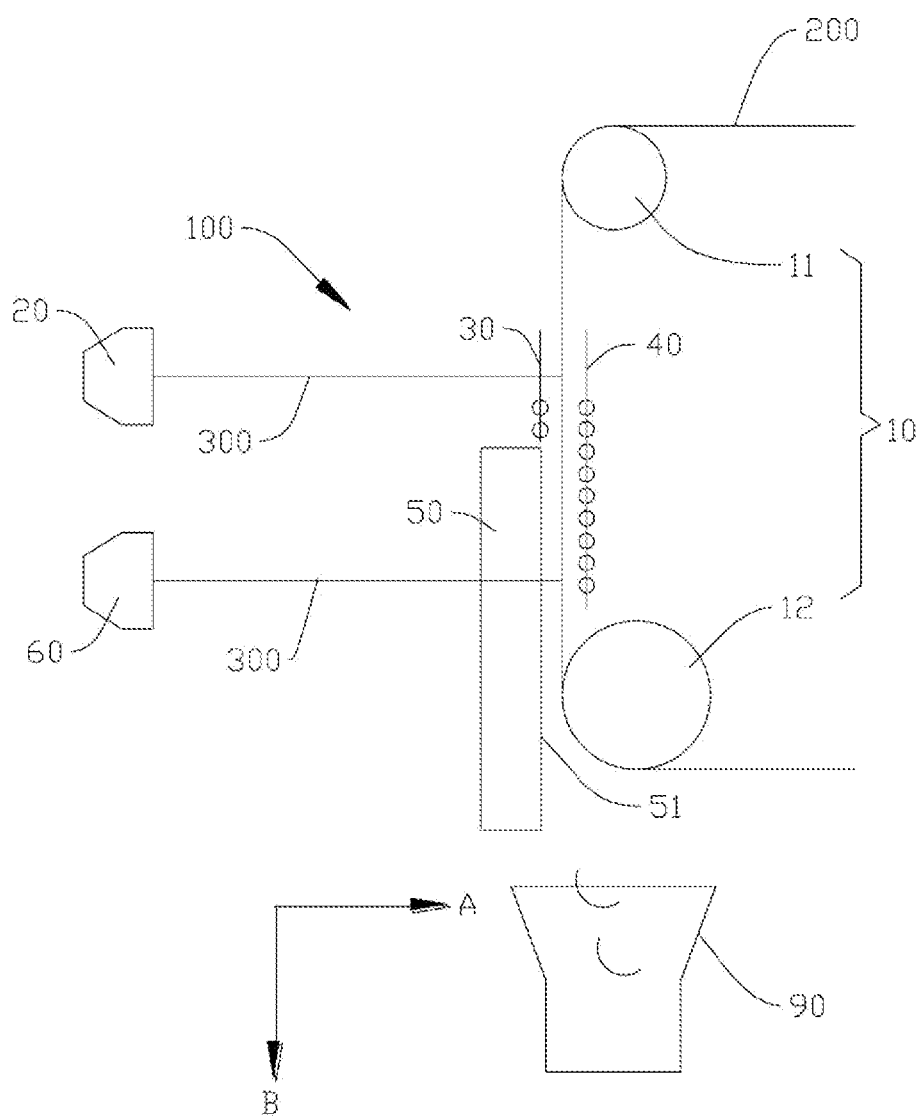
FIG. 1 is a schematic structural diagram of a die-cutting device according to some embodiments of the present application.

List of reference signs: 100—die-cutting device; 10—conveying mechanism; 11—first transmission roller; 12—second transmission roller; 20—first cutting mechanism; 30—first limiting member; 31—first cutting hole; 32—first rolling body; 33—first limiting portion; 331—first surface; 34—first connecting portion; 40—second limiting member; 41—second cutting hole; 42—second rolling body; 43—second limiting portion; 44—second connecting portion; 50—guide mechanism; 51—adsorption face; 52—first adsorption hole; 53—second adsorption hole; 60—second cutting mechanism; 70—third limiting member; 71—through hole; 80—dust removal mechanism; 90—scrap collection mechanism; 200—electrode plate; 210—uncoated region; 220—coated region; 300 laser light; A—thickness direction of electrode plate; B—conveying direction of electrode plate; C—width direction of electrode plate.

DETAILED DESCRIPTION OF EMBODIMENTS

In order to make the objects, technical solutions and advantages of embodiments of the present application clearer, the technical solutions in the embodiments of the present application will be described clearly and completely below with reference to the accompanying drawings in the embodiments of the present application. Obviously, the embodiments described are some of, rather than all of, the embodiments of the present application. Generally, the assemblies of the embodiments of the present application described and illustrated in the accompanying drawings herein may be arranged and designed in a variety of different configurations.

Thus, the following detailed description of the embodiments of the present application provided in the accompanying drawings is not intended to limit the scope of the present application as claimed, but is merely representative of the selected embodiments of the present application. All the other embodiments obtained by those of ordinary skill in the art based on the embodiments of the present application without any creative effort shall fall within the scope of protection of the present application.

It should be noted that the embodiments in the present application and features in the embodiments may be combined with each other without conflicts.

It should be noted that like numerals and letters refer to like items in the following accompanying drawings, so once an item is defined in one accompanying drawing, it does not require further definition and explanation in subsequent accompanying drawings.

In the description of the embodiments of the present application, it should be noted that the indicated orientations or positional relationships are based on the orientations or positional relationships shown in the accompanying drawings or are orientations or positional relationships in which a product of the present application is conventionally placed when in use, or the orientations or positional relationships commonly understood by those skilled in the art, and are intended to facilitate the description of the present application and simplify the description only, rather than indicating or implying that the device or element referred to must have a particular orientation or be constructed and operated in a particular orientation, and will not to be interpreted as limiting the present application. In addition, the terms "first", "second", "third", etc. are merely used for distinct description, and shall not be construed as indicating or implying relative importance.

At present, from the perspective of the development of the market situation, the traction batteries are used more and more widely. The traction batteries are not only used in energy storage power systems such as hydroelectric power plants, thermal power plants, wind power plants and solar power plants, but also widely used in electric transportation means such as electric bicycles, electric motorcycles and electric vehicles and in many fields such as military equipment and aerospace. With the continuous expansion of the application field of traction batteries, the market demand for the traction batteries is also expanding.

A battery cell of the battery comprises an electrode assembly and an electrolyte, and the electrode assembly is composed of a positive electrode plate, a negative electrode plate and a separator. The operation of the battery monomer mainly relies on the movement of metal ions between the positive electrode plate and the negative electrode plate.

The positive electrode plate and the negative electrode plate each comprises a coated region and an uncoated region, and the uncoated region is connected to the coated region and protrudes from the coated region in a width direction of the electrode plate. In the positive electrode plate, the coated region is coated with a positive active material layer, and the positive active material may be lithium cobaltate, lithium iron phosphate, ternary lithium or lithium manganate, etc. In the negative electrode plate, the coated region is coated with a negative active material layer, and the negative active material may be carbon or silicon, etc. A tab of the electrode plate is formed in the uncoated region. In some other embodiments, in order to ensure the structural strength of the tab, the portion of the tab close to the coated region may also be coated with a certain active material layer.

The inventor has found that, in the related art, no matter it is a positive electrode plate or a negative electrode plate, during the process of cutting an uncoated region to form a tab, both a conveying force of a conveying mechanism and a cutting force of a cutting mechanism of the electrode plate cause the electrode plate to greatly jitter in a thickness direction of the electrode plate, resulting in poor cutting stability, and an excessive jitter amplitude of the electrode plate may also cause the electrode plate to be out of a cutting range of the cutting mechanism, resulting in incomplete cutting or inability to achieve cutting to seriously affect the forming quality of the electrode plate.

On the basis of the above considerations, in order to solve the problem of poor forming quality of an electrode plate caused by the jitter of the electrode plate during the process of cutting the electrode plate to form a tab, the inventor has designed, through in-depth research, a die-cutting device in which a first limiting member, which has a cutting hole that allows laser light to pass through, and a second limiting member are respectively provided on two sides of an electrode plate, and respectively limit the electrode plate on the two sides of the electrode plate in a thickness direction, so as to cooperatively limit the range of jitter of the electrode plate in the thickness direction to improve the cutting stability, thereby improving the forming quality of the electrode plate. The first limiting member is located between the electrode plate and the first cutting mechanism in the thickness direction of the electrode plate, and the cutting hole is provided to allow the laser light emitted by the first cutting mechanism to pass through, so as to cut the electrode plate and prevent the laser light from cutting the first limiting member.

Figure 2:
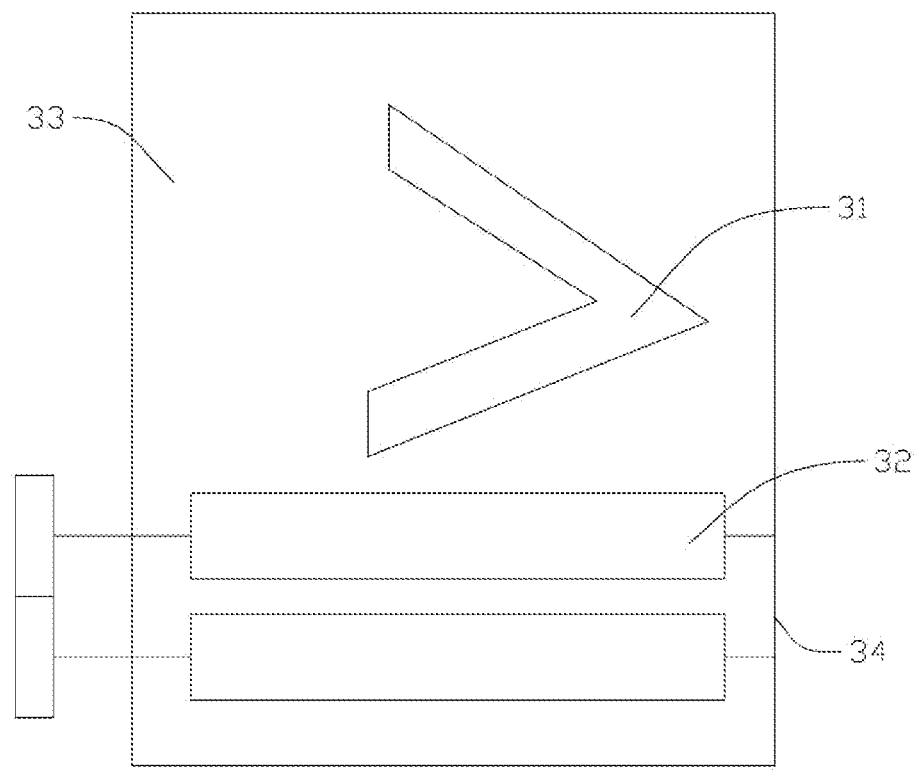
FIG. 2 is a schematic structural diagram of a first limiting member from a first perspective according to some embodiments of the present application.

Referring to FIG. 1, FIG. 1 is a schematic structural diagram of a die-cutting device 100 according to some embodiments of the present application. The die-cutting device 100 comprises a conveying mechanism 10, a first cutting mechanism 20, a first limiting member 30 and a second limiting member 40. The conveying mechanism 10 is configured to convey an electrode plate 200. The electrode plate 200 comprises an uncoated region 210 (shown in FIG. 8) and a coated region 220 (shown in FIG. 8), the uncoated region 210 being connected to the coated region 220. The first cutting mechanism 20 is located on one side of the electrode plate in a thickness direction A, and the first cutting mechanism 20 is configured to cut the uncoated region 210 to allow the uncoated region 210 to form a scrap portion (not shown in the figure) connected to the coated region 220 and a tab (not shown in the figure) connected to the coated region 220 and separated from the scrap portion. The first limiting member 30 is located between the electrode plate 200 and the first cutting mechanism 20 in the thickness direction, and the first limiting member 30 is provided with a cutting hole (shown in FIG. 2 and defined as a first cutting hole 31) that allows laser light 300 emitted by the first cutting mechanism 20 to pass through, the cutting hole matching a cutting trajectory of the laser light 300. The second limiting member 40 is located on the side of the electrode plate 200 that faces away from the first limiting member 30 in the thickness direction, and the second limiting member 40 is configured to cooperate with the first limiting member 30 to limit the electrode plate 200 in the thickness direction.

In some embodiments, the conveying mechanism 10 includes a first transmission roller 11 and a second transmission roller 12. The first transmission roller 11 and the second transmission roller 12 cooperate to convey the electrode plate 200, and the first limiting member and the second limiting member 40 are located between the first transmission roller 11 and the second transmission roller 12 in a conveying direction B of the electrode plate 200. The conveying mechanism 10 conveys the electrode plate 200 to the first cutting mechanism 20 at a certain speed, and the first cutting mechanism emits the laser light 300 to the electrode plate 200 to cut the uncoated region 210.

The first transmission roller 11 and the second transmission roller 12 cooperate to convey the electrode plate 200, so that the conveying stability can be improved so as to improve the cutting stability and the forming quality of the electrode plate 200.

The first cutting mechanism 20 is located on one side of the electrode plate in the thickness direction A, and the first limiting member 30 is located between the electrode plate 200 and the first cutting mechanism 20 in the thickness direction A of the electrode plate. The laser light 300 triggered by the first cutting mechanism 20 passes through the cutting hole in the first limiting member 30 and then acts on the electrode plate 200 to cut the uncoated region 210 of the electrode plate 200. The first cutting mechanism 20 is a laser light 300 cutting mechanism, the conveying mechanism 10 conveys the electrode plate 200 to the first cutting mechanism 20 at a certain speed, and the first cutting mechanism emits the laser light 300 to the electrode plate 200 to cut the uncoated region 210.

The cutting hole (the first cutting hole 31) matches the cutting trajectory of the laser light 300 (the laser light emitted by the first cutting mechanism 20), so that it may be understood that the shape of the cutting hole is the same as the moving trajectory of the laser light 300 emitted by the first cutting mechanism 20, and it may also be understood that the laser light 300 emitted by the first cutting mechanism 20 can move in the cutting hole, so as to cut the electrode plate 200 without cutting the first limiting member 30. The cutting hole may be in various shapes, for example, the cutting hole is in a rectangular shape, an I-shape, a circular shape, etc., as long as the first limiting member 30 can achieve avoidance for the laser light 300 emitted by the first cutting mechanism 20.

In some embodiments, the second limiting member 40 may also be provided with a cutting hole, the cutting hole in the first limiting member 30 is disposed opposite the cutting hole in the second limiting member 40 in the thickness direction A of the electrode plate, and the cutting hole in the second limiting member 40 also allows the laser light 300 emitted by the first cutting mechanism 20 to pass through, so as to prevent the laser light 300 passing through the electrode plate 200 from cutting the second limiting member 40. The shape and size of the cutting hole provided in the second limiting member 40 may refer to the shape and size of the cutting hole provided in the first limiting member 30. For convenience of illustration in the figures, the cutting hole in the first limiting member 30 is defined as a first cutting hole 31, and the cutting hole in the second limiting member 40 is defined as a second cutting hole 41 (shown in FIG. 7).

During the process of cutting the electrode plate 200 to form the tab, both a conveying force of the conveying mechanism 10 and a cutting force of the cutting mechanism may cause the electrode plate 200 to jitter in the thickness direction, resulting in unstable cutting to affect the cutting quality of the tab, and an excessive jitter amplitude of the electrode plate 200 may also cause the electrode plate 200 to be out of a cutting range of the cutting mechanism, resulting in incomplete cutting or inability to achieve cutting. The first limiting member 30 and the second limiting member 40 are respectively provided on the two sides of the electrode plate 200, so that the first limiting member 30 and the second limiting member 40 respectively limit the electrode plate 200 on the two sides of the electrode plate in the thickness direction A, so as to cooperatively limit the range of jitter of the electrode plate 200 in the thickness direction to improve the cutting stability, thereby improving the forming quality of the electrode plate 200. The first limiting member 30 is located between the electrode plate 200 and the first cutting mechanism 20 in the thickness direction A of the electrode plate, and the cutting hole is provided to allow the laser light 300 emitted by the first cutting mechanism 20 to pass through, so as to cut the electrode plate 200 and prevent the laser light 300 from cutting the first limiting member 30.

Referring to FIG. 1, in some embodiments, the first limiting member 30 and the second limiting member 40 at least partially overlap in the thickness direction to form an overlapping region, and the first cutting mechanism 20 is configured to cut the uncoated region 210 in the overlapping region.

The thickness direction herein refers to the thickness direction A of the electrode plate. The first limiting member 30 and the second limiting member 40 at least partially overlapping to form the overlapping region actually means that the projections of the first limiting member 30 and the second limiting member 40 on the electrode plate 200 at least partially overlap in the thickness direction A of the electrode plate. It may be that two ends of the first limiting member are flush with two ends of the second limiting member 40 in a conveying direction B of the electrode plate. It may also be that one end of the first limiting member 30 is flush with one end of the second limiting member 40 in the conveying direction B of the electrode plate, and the other end of the second limiting member 40 is beyond the other end of the first limiting member 30 in the conveying direction B of the electrode plate (which is as the relative relationship between the first limiting member 30 and the second limiting member 40 as shown in FIG. 1); or in the conveying direction B of the electrode plate, one end of the first limiting member 30 is beyond one end of the second limiting member 40 in the opposite direction of the conveying direction B of the electrode plate, and the other end of the second limiting member 40 is beyond the other end of the second limiting member 40 in the conveying direction B of the electrode plate. The first limiting member 30 and the second limiting member 40 both cover at least part of the uncoated region 210 in a width direction C of the electrode plate.

The laser light 300 emitted by the first cutting mechanism 20 is projected in the overlapping region. The first cutting mechanism 20 cuts the uncoated region 210 in the overlapping region formed by the first limiting member 30 and the second limiting member 40, so that the two sides of the electrode plate 200 in the thickness direction corresponding to the cutting region of the first cutting mechanism 20 are both limited, which can limit the range of jitter of the electrode plate 200 in the thickness direction A and can limit the jitter degree of the electrode plate 200 in the thickness direction A of the electrode plate within the cutting range of the first cutting mechanism 20, so that the cutting stability can be improved.

In some embodiments, the first limiting member 30 comprises a first rolling body 32 configured to abut against the uncoated region 210.

The first rolling body 32 may be in many structural forms, for example, the first rolling body 32 may be a roller shaft, a ball, etc.

the jitter of the electrode plate 200 in the thickness direction may cause the uncoated region 210 of the electrode plate 200 to abut against the first limiting member 30, and the first rolling body 32 of the first limiting member 30 abuts against the uncoated region 210, so that the uncoated region 210 is in rolling frictional contact with the first limiting member 30, and the uncoated region 210 has small friction damping, thereby improving the transmission stability of the electrode plate 200 and reducing the abrasion of the electrode plate 200, so as to effectively prevent tearing of the tab, even serious consequences such as strip breakage, due to large damping between the tab and the first limiting member 30 after the tab is separated from the scrap portion.

In some embodiments, the first rolling body 32 is disposed downstream of the first cutting mechanism 20.

It should be noted that "upstream" and "downstream" mentioned in context of embodiments of the present application refer to production sequences, the upstream referring to the production sequence coming first, and the downstream referring to the production sequence coming later, instead of defining spatial positions of the components.

One or more (two or above) first rolling bodies 32 may be provided. In an embodiment where a plurality of first rolling bodies 32 are provided, some of the first rolling bodies 32 in the plurality of first rolling bodies 32 may be located upstream of the first cutting mechanism 20, and the other first rolling bodies 32 may be located downstream of the first cutting mechanism 20. In the case where a plurality of first rolling bodies 32 are provided, the plurality of first rolling bodies 32 may all be located downstream of the first cutting mechanism 20. As shown in FIG. 1, the first rolling bodies 32 are roller shafts, and the plurality of roller shafts are arranged side by side in parallel and at intervals in a conveying direction of the electrode plate 200.

Since the scrap portion and the tab do not restrict each other after the scrap portion is separated from the tab, the tab and the scrap portion are both easily stuck with the first limiting member 30 when they are in contact with the first limiting member 30. Thus, the first rolling body 32 is disposed downstream of the first cutting mechanism 20, so that the separated tab and the scrap portion may both be in rolling fit with the first limiting member 30, so as to reduce the risk of tearing of the tab and strip breakage caused by the tab and the scrap portion being stuck with the first limiting member 30.

Figure 3:
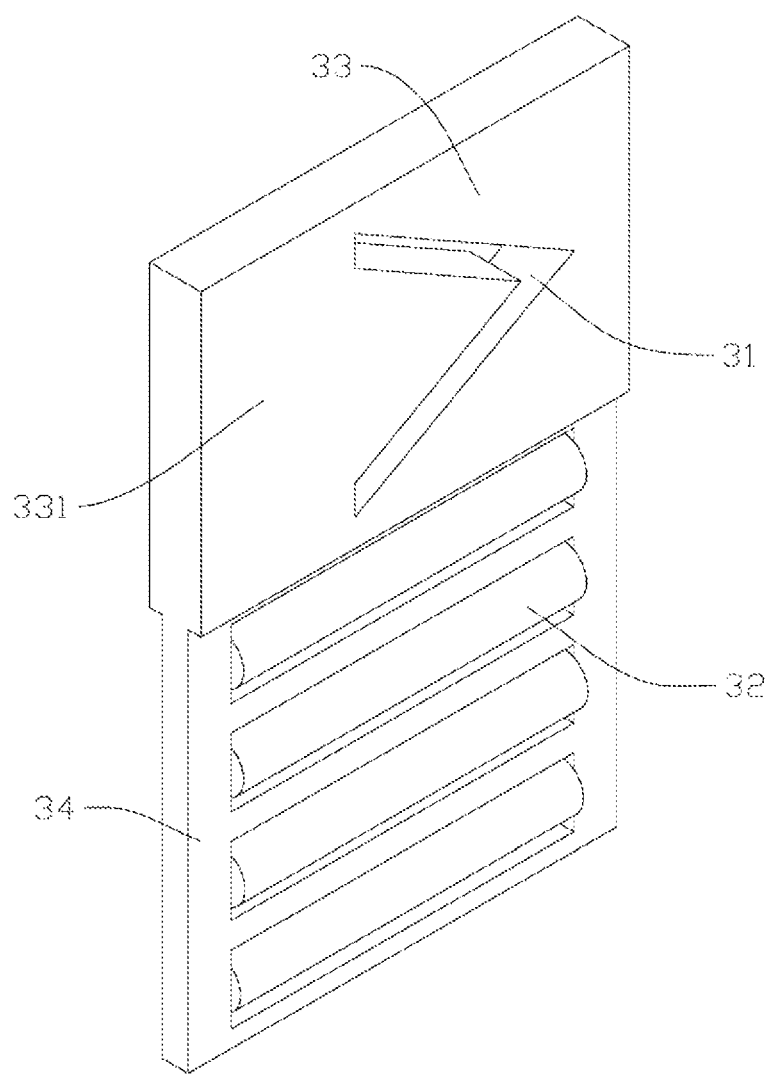
FIG. 3 is a schematic structural diagram of a first limiting member from a second perspective according to some embodiments of the present application.
Figure 4:
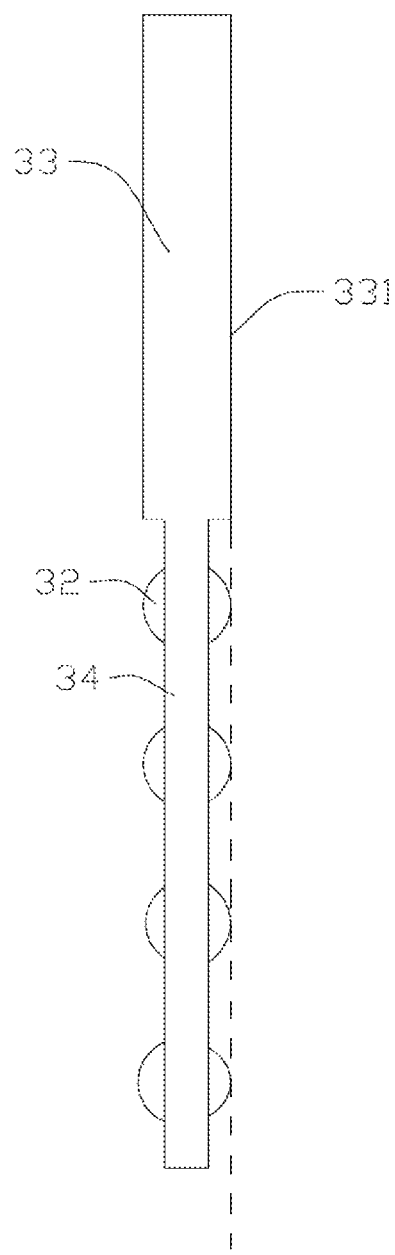
FIG. 4 is a schematic structural diagram of a first limiting member from a third perspective according to some embodiments of the present application.

Referring to FIGS. 1, 2, 3 and 4, FIG. 2 is a schematic structural diagram of a first limiting member 30 from a first perspective according to some embodiments of the present application, FIG. 3 is a schematic structural diagram of a first limiting member 30 from a second perspective according to some embodiments of the present application, and FIG. 4 is a schematic structural diagram of a first limiting member 30 from a third perspective according to some embodiments of the present application. In some embodiments, the first limiting member 30 further comprises a first limiting portion 33 and a first connecting portion 34, the first rolling body 32 being mounted on the first connecting portion 34, and the surface of the first limiting portion 33 that faces the electrode plate 200 being flush with the edge of the first rolling body 32 that is configured to abut against the uncoated region 210.

The first limiting portion 33 is of a plate-like structure, the cutting hole of the first limiting member 30 is provided at the first limiting portion 33, the first connecting portion 34 is connected to one end of the first limiting portion 33 and located downstream of the first limiting portion 33, and the first limiting portion 33 has a thickness greater than that of the first connecting portion 34. The first rolling body 32 is rotatably mounted on the first connecting portion 34. The first rolling body 32 may be driven by a magnetic wheel.

The first limiting portion 33 has a first surface 331 that faces the electrode plate 200, and the surface of the first rolling body 32 that is configured to abut against the uncoated region 210 is a circumferential face of the first rolling body 32. The surface of the first limiting portion 33 that faces the electrode plate 200 being flush with the edge of the first rolling body 32 that is configured to abut against the uncoated region 210 may be interpreted as the extension surface of the first surface 331 being tangent to the circumferential face of the first rolling body 32. In some embodiments, the axis of rotation of the first rolling body 32 is located on a thickness central plane of the first limiting portion 33, and then the first rolling body 32 has a diameter equal to the thickness of the first limiting portion 33. The thickness central plane of the first limiting portion 33 refers to a plane located at the center of the first limiting portion 33 in a thickness direction of the first limiting portion 33 and parallel to the first surface 331. The thickness direction of the first limiting portion 33 is the same as the thickness direction A of the electrode plate, the thickness of the first limiting portion 33 refers to the dimension of the first limiting portion 33 in the thickness direction thereof, and the thickness of the first connecting portion 34 refers to the dimension of the first connecting portion 34 in the thickness direction of the first limiting portion 33.

The surface of the first limiting portion 33 that faces the electrode plate 200 is flush with the edge of the first rolling body 32 that is configured to abut against the uncoated region 210, and then the first limiting portion 33 and the first rolling body 32 have the same distance from the electrode plate 200 to allow the electrode plate 200 to have the same range of jitter in the thickness direction, thereby improving the cutting stability and reducing the risk of large deformation of the electrode plate 200 so as to improve the forming quality of the electrode plate 200.

Figure 5:
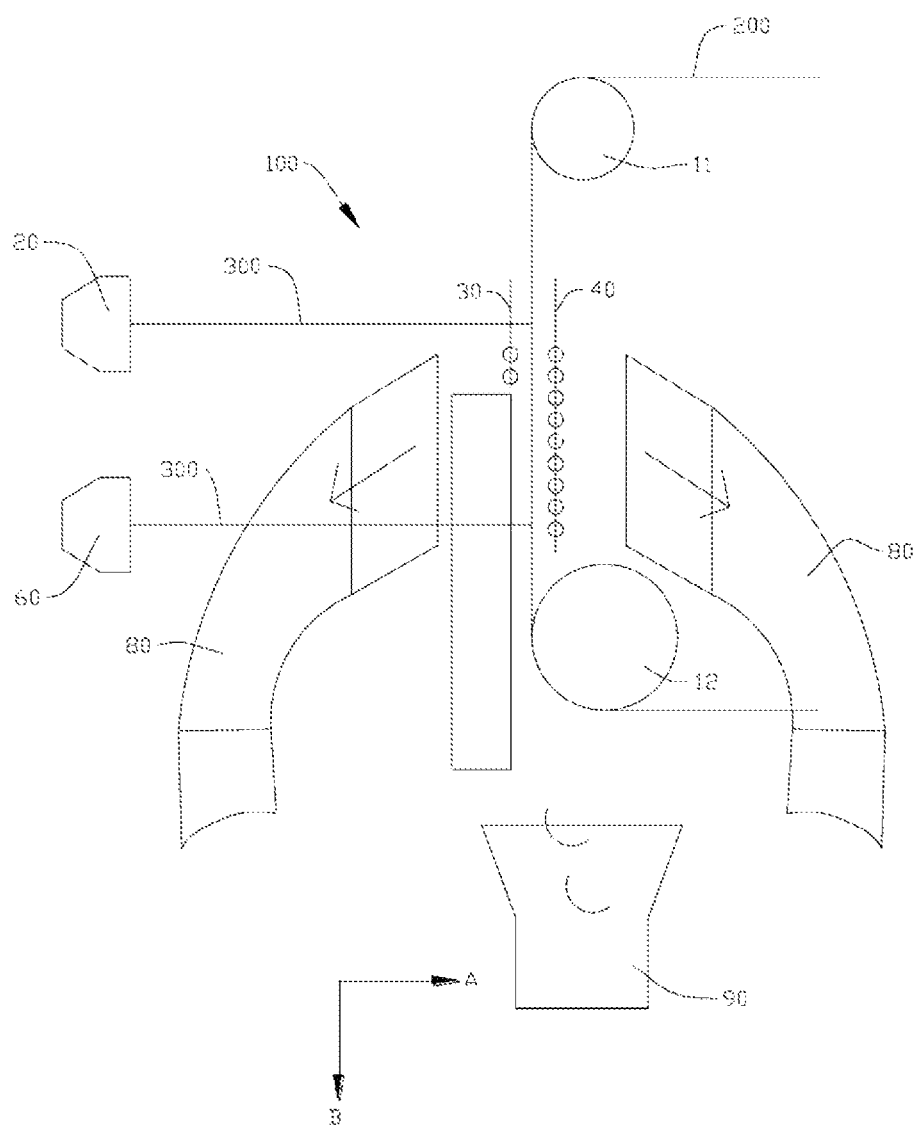
FIG. 5 is a schematic structural diagram of a die-cutting device according to some other embodiments of the present application.

Referring to FIG. 5, FIG. 5 is a schematic structural diagram of a die-cutting device 100 according to some other embodiments of the present application. In some embodiments, the die-cutting device 100 further comprises a second cutting mechanism 60 and a guide mechanism 50. The second cutting mechanism 60 is disposed on one side of the electrode plate 200 in the thickness direction, the second cutting mechanism 60 is disposed downstream of the first cutting mechanism 20, and the second cutting mechanism 60 is configured to cut the scrap portion to separate the scrap portion from the coated region 220. The guide mechanism 50 is disposed downstream of the first limiting member 30, and the guide mechanism 50 is configured to drive the scrap portion to offset towards the second cutting mechanism 60.

The second cutting mechanism 60 is a laser light 300 cutting mechanism. The laser light 300 emitted by the second cutting mechanism 60 is projected on one side of the adsorption mechanism in the width direction C of the electrode plate, so as to prevent the laser light 300 emitted by the second cutting mechanism 60 from cutting the adsorption mechanism.

The electrode plate 200 is formed in two steps by the first cutting mechanism 20 and the second cutting mechanism 60. In the first step, the tab is separated from the scrap portion, so that during the cutting operation, the jitter of the scrap portion has little influence on the tab, so as to greatly reduce the risk of decrease of product qualification rate due to the deformation of the tab caused by the jitter of the scrap portion and the damage of the tab caused by being pulled by the scrap portion, and also improve the forming quality of the electrode plate 200.

As shown in FIG. 5, the first cutting mechanism 20 and the second cutting mechanism 60 are located on the same side of the electrode plate in the thickness direction A. In other embodiments, the first cutting mechanism 20 and the second cutting mechanism 60 may be located on opposite sides of the electrode plate in the thickness direction A.

After the scrap portion is separated from the tab, the scrap portion is cut to separate the scrap portion from the coated region 220, so that the cutting of the electrode plate 200 is completed. The guide mechanism 50 drives the scrap portion to offset towards the second cutting mechanism 60 to compensate for the deformation of the electrode plate 200 during the cutting process of the first cutting mechanism 20, so that the scrap portion offsets to be within the cutting range of the second cutting mechanism 60 (for the laser light 300 cutting mechanism, the cutting range is a range that the laser light 300 can reach) so as to ensure that the second cutting mechanism 60 can effectively cut the electrode plate 200.

In some embodiments, the guide mechanism 50 is an adsorption mechanism, and the guide mechanism 50 and the second cutting mechanism 60 are located on the same side in the thickness direction.

The thickness direction herein refers to the thickness direction A of the electrode plate, and the guide mechanism 50 and the second cutting mechanism 60 are located on the same side of the thickness direction. The adsorption mechanism may be a negative pressure mechanism. In other embodiments, the guide mechanism 50 and the second cutting mechanism 60 may be respectively located on two sides of the electrode plate in the thickness direction A, and the guide mechanism 50 may be a blowing mechanism configured to blow the scrap portion towards the second cutting mechanism 60 such that the scrap portion offsets towards the second cutting mechanism 60.

The adsorption mechanism drives the uncoated region 210 by adsorption to offset towards the second cutting mechanism 60, so that the offset amount of the scrap portion can be controlled more accurately.

Figure 6:
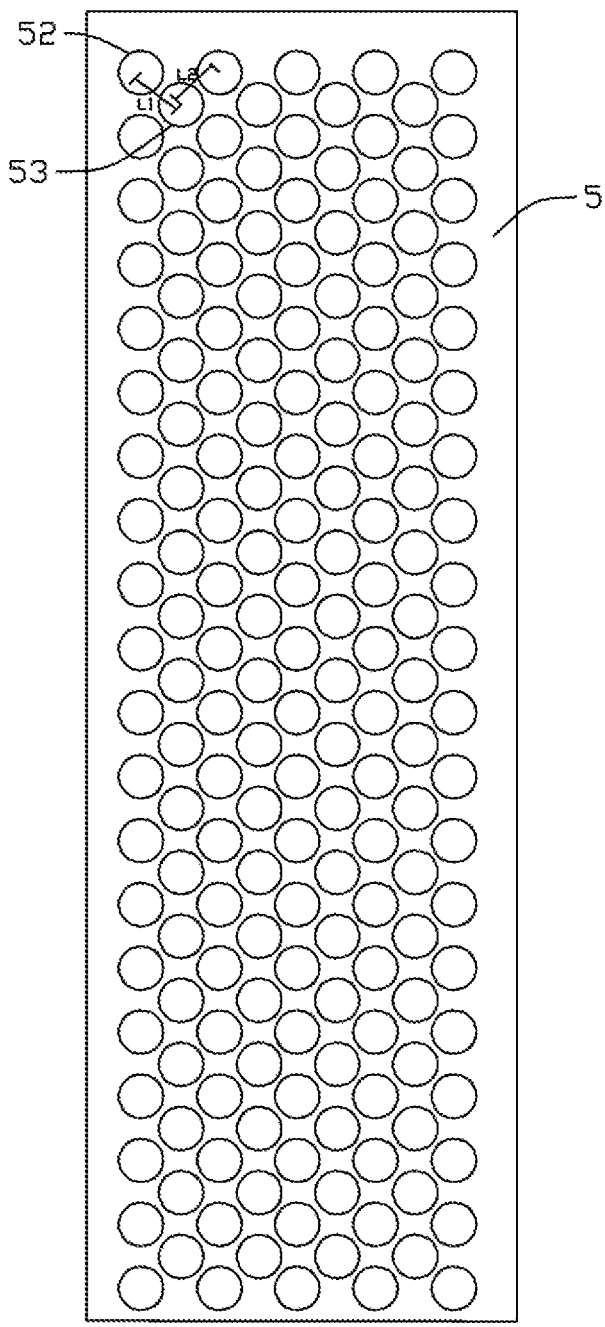
FIG. 6 is a schematic structural diagram of an adsorption mechanism provided with adsorption holes.

Referring to FIG. 6, FIG. 6 is a schematic structural diagram of an adsorption mechanism provided with adsorption holes. In some embodiments, the adsorption mechanism comprises an adsorption face provided with a plurality of adsorption holes 51.

The adsorption mechanism may comprise an adsorption belt, and the adsorption face 51 is a surface of the adsorption belt. Each adsorption hole may have a diameter of 3 mm. The adsorption face 51 is provided with multiple rows of first adsorption holes 52 and at least one row of second adsorption holes 53, each row of first adsorption holes 52 including at least two first adsorption holes 52 arranged at intervals in the width direction C of the electrode plate, the multiple rows of first adsorption holes 52 being arranged at intervals in the conveying direction B of the electrode plate, and one row of second adsorption holes 53 being provided between two adjacent rows of first adsorption holes 52. The spacing of the two adjacent rows of first adsorption holes 52 may be 2 mm, and the spacing between the two adjacent rows of second adsorption holes 53 may be 2 mm. In some embodiments, the adsorption face 51 is flush with the first surface 331 of the first limiting portion 33 that is configured to abut against the uncoated region 210.

In the same row of first adsorption holes 52, the two adjacent first adsorption holes 52 have the same distance from the center of each first adsorption hole to the center of the nearest second adsorption hole 53, that is, in FIG. 6, L1=L2. In this way, the adsorption holes are distributed in a staggered manner, so that when the scrap portion is not completely out of control of the front row of adsorption holes, the next row of adsorption holes work, which ensures that the separation of the scrap portion from the coated region 220 is always controlled so as to avoid influence of the jitter of the scrap portion on the cutting stability.

Thus, providing the adsorption holes can improve the adsorption stability, thereby effectively improve the cutting stability of the scrap portion.

In some embodiments, the guide mechanism 50 and the first limiting member 30 are located on the same side in the thickness direction; and the second limiting member 40 comprises second rolling bodies 42 configured to abut against the uncoated region 210.

The second rolling bodies 42 may be in many structural forms, for example, the second rolling bodies 42 may be roller shafts, balls, etc.

The guide mechanism 50 and the first limiting member 30 are located on the same side of the electrode plate in the thickness direction A, the uncoated region 210 may abut against the second limiting member 40 due to the jitter of the electrode plate 200 in the thickness direction, and the second rolling bodies 42 of the second limiting member 40 abut against the uncoated region 210, so that the uncoated region 210 is in rolling frictional contact with the second limiting member 40, and the uncoated region 210 has small friction damping, thereby improving the transmission stability of the electrode plate 200 and reducing the abrasion of the electrode plate 200, so as to effectively prevent tearing of the tab, even serious consequences such as strip breakage, due to large damping between the tab and the second limiting member 40 after the tab is separated from the scrap portion.

Figure 7:
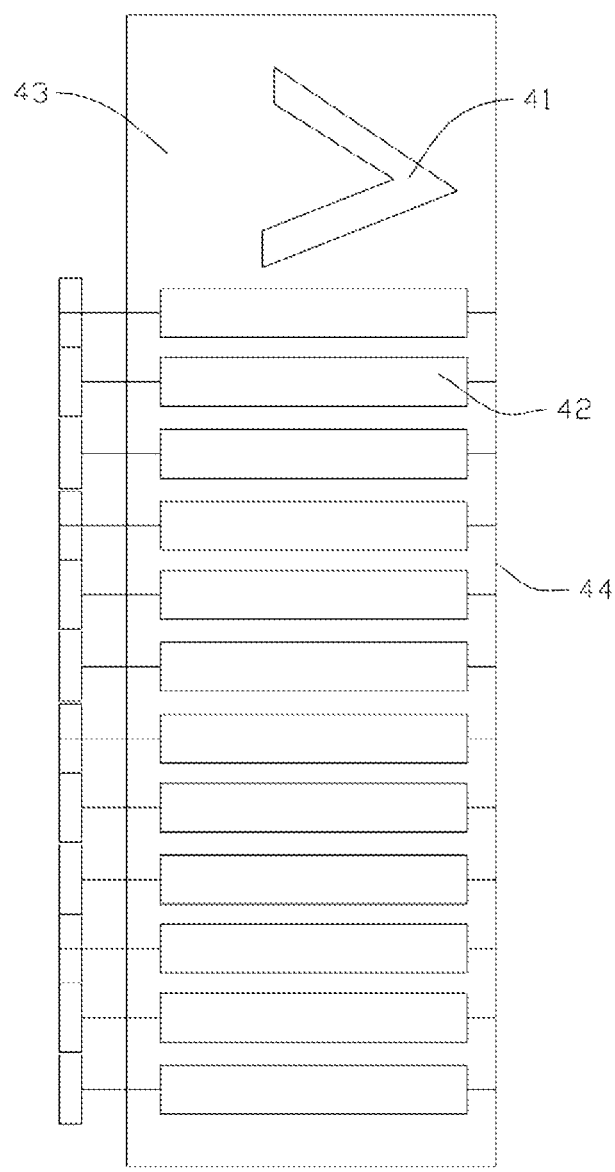
FIG. 7 is a schematic structural diagram of a second limiting member according to an embodiment of the present application.

Referring to FIG. 7, FIG. 7 is a schematic structural diagram of a second limiting member according to some embodiments of the present application. In some embodiments, a plurality of second rolling bodies 42 are provided, the plurality of second rolling bodies 42 are located downstream of the first cutting mechanism 20, some of the plurality of second rolling bodies 42 are located upstream of the second cutting mechanism 60, and some of the plurality of second rolling bodies 42 are located downstream of the second cutting mechanism 60.

In other embodiments, some of the plurality of second rolling bodies 42 may be located upstream of the first cutting mechanism 20.

Some of the second rolling bodies 42 are disposed upstream of the second cutting mechanism 60, and some of the second rolling bodies 42 are disposed downstream of the second cutting mechanism 60, so that the scrap portion can be in rolling contact with the second limiting member 40 before and after being separated from the coated region 220, so as to reduce the resistance of the electrode plate 200 during the transmission process, improve the transmission stability of the electrode plate 200, and reduce the abrasion of the electrode plate 200.

Further referring to FIG. 7, in some embodiments, the second limiting member 40 further comprises a second limiting portion 43 and a second connecting portion 44, the second rolling bodies 42 being mounted on the second connecting portion 44, and the surface of the second limiting portion 43 that faces the electrode plate 200 being flush with the edges of the second rolling bodies 42 that are configured to abut against the scrap portion.

The second limiting portion 43 is of a plate-like structure, the second limiting portion 43 is disposed opposite the first limiting portion 33, the cutting hole of the second limiting member is provided at the second limiting portion 43, the second connecting portion 44 is connected to one end of the second limiting portion 43 and located downstream of the second limiting portion 43, and the second limiting portion 43 has a thickness greater than that of the second connecting portion 44. The second rolling bodies 42 are rotatably mounted on the second connecting portion 44. The second limiting portion 43 has a second surface that faces the electrode plate 200, and the surfaces of the second rolling bodies 42 that are configured to abut against the uncoated region 210 are circumferential faces of the second rolling bodies 42. The surface of the second limiting portion 43 that faces the electrode plate 200 being flush with the edges of the second rolling bodies 42 that are configured to abut against the uncoated region 210 may be interpreted as the extension surface of the second surface being tangent to the circumferential faces of the second rolling bodies 42. In some embodiments, the axes of rotation of the second rolling bodies are located on a thickness central plane of the second limiting portion 43, and then each second rolling body 42 has a diameter equal to the thickness of the second limiting portion 43. The thickness central plane of the second limiting portion 43 refers to a plane located at the center of the second limiting portion 43 in a thickness direction of the second limiting portion 43 and parallel to the second surface. The thickness direction of the second limiting portion 43 is consistent with the thickness direction A of the electrode plate, the thickness of the second limiting portion 43 refers to the dimension of the second limiting portion 43 in the thickness direction thereof, and the thickness of the second connecting portion 44 refers to the dimension of the second connecting portion 44 in the thickness direction of the second limiting portion 43.

The surface of the second limiting portion 43 that faces the electrode plate 200 is flush with the edges of the second rolling bodies 42 that are configured to abut against the uncoated region 210, and then the second limiting portion 43 and the second rolling bodies 42 have the same distance from the electrode plate 200 to allow the electrode plate 200 to have the same range of jitter in the thickness direction, thereby improving the cutting stability and reducing the risk of large deformation of the electrode plate 200 so as to improve the forming quality of the electrode plate 200.

Figure 8:
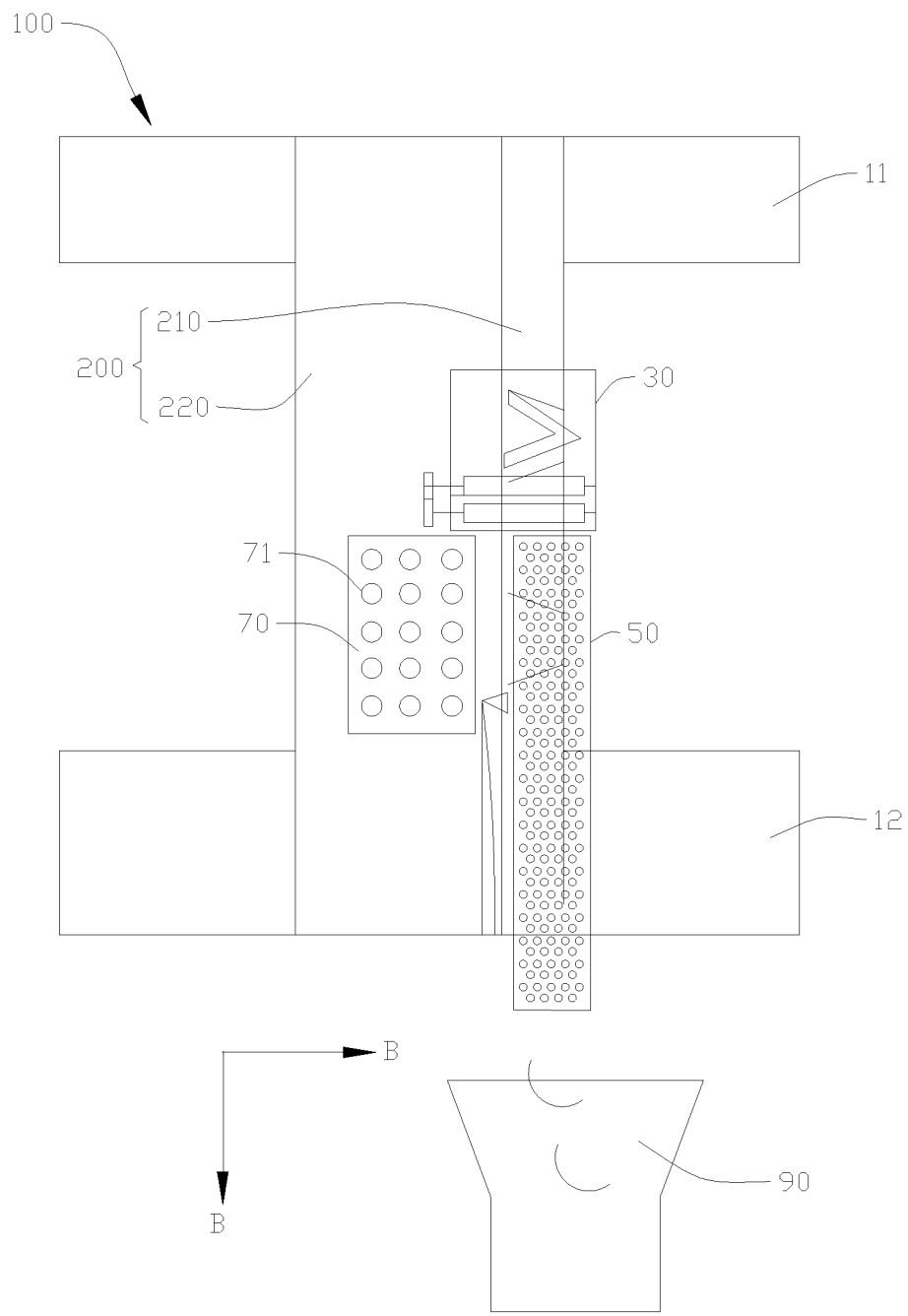
FIG. 8 is a schematic structural diagram of a die-cutting device according to further embodiments of the present application.

Referring to FIG. 8, FIG. 8 is a schematic structural diagram of a die-cutting device 100 according to some embodiments of the present application. In some embodiments, the die-cutting device 100 further comprises a third limiting member 70, and in the thickness direction, the third limiting member 70 is arranged on one side of the coated region 220, and the third limiting member 70 is configured to limit the coated region 220 in an offset direction of the scrap portion.

The third limiting member 70 is of a plate-like structure, and in the width direction C of the electrode plate, the third limiting member 70 and the guide mechanism 50 are arranged side by side at an interval, and the laser light 300 emitted by the second cutting mechanism 60 passes between the third limiting member 70 and the guide mechanism 50 and is then projected to the electrode plate 200.

Since the scrap portion will make the coated region 220 offset to cause deformation of the electrode plate 200 during the process of the guide mechanism 50 driving the scrap portion to offset towards the second cutting mechanism 60, the coated region 220 is limited by the third limiting member 70 in the offset direction of the scrap portion, so that the maximum deformation of the electrode plate 200 is limited so as to improve the forming quality of the electrode plate 200.

In some embodiments, the third limiting member 70 is provided with a plurality of through holes 71.

The plurality of through holes 71 may be arranged in many ways, such as arranged in a rectangular array or arranged in a circular array.

The through holes 71 are provided such that dust is not easy to accumulate on the third limiting member 70, and providing the through holes 71 can also reduce the weight of the third limiting member 70.

In some embodiments, the die-cutting device 100 further comprises a dust removal mechanism 80 (shown in FIG. 5). The dust removal mechanism 80 is configured to remove dust generated on the electrode plate 200 when the second cutting mechanism 60 cuts the scrap portion of the electrode plate 200.

As shown in FIG. 5, two dust removal mechanisms 80 may be provided. The two dust removal mechanisms 80 are respectively disposed on two sides of the electrode plate in the thickness direction A so as to remove dust from the electrode plate 200 from two sides of the electrode plate in the thickness direction A, thereby improving the dust removal efficiency. In some embodiments, a dust removal mechanism 80 may be provided corresponding to a cutting position of the first cutting mechanism 20 to remove dust generated on the electrode plate 200 when the first cutting mechanism 20 cuts the electrode plate 200 to form a tab. Since the first cutting mechanism 20 produces less dust when cutting, the dust removal mechanism 80 corresponding to the first cutting mechanism 20 may be disposed on one side or both sides of the electrode plate 200 in the width direction, and dust can be adsorbed on one side of the electrode plate in the width direction C by means of a negative pressure dust removal mechanism 80.

The dust removal mechanism 80 may be a negative pressure dust removal mechanism 80, and in the case where two negative pressure dust removal mechanisms 80 are distributed on two sides of the electrode plate in the thickness direction A, according to an actual sputtering trajectory of dust generated in front of and behind the electrode plate 200, convection negative pressure dust removal mechanisms 80 are designed in front of and behind a cutting point of the electrode plate 200, thereby improving the dust removal efficiency while not affecting the cutting stability.

For the structure of the negative pressure dust removal mechanism 80, reference can be made to the related art, which will not be repeated herein. Certainly, the dust removal mechanism 80 may be a dust removal mechanism 80 in other forms.

A coating of part of the coated region 220 will be generally cut during the process of separating the scrap portion from the coated region 220, and a lot of dust will be generated when the coating is cut. The dust removal mechanism 80 is configured to remove the dust generated on the electrode plate 200 when the second cutting mechanism 60 cuts the scrap portion of the electrode plate 200, so as to maintain a clean cutting environment and avoid influence of the dust on the cutting operation of the second cutting mechanism 60, which is conducive to improving the forming quality of the electrode plate 200.

In some embodiments, the die-cutting device 100 further comprises a scrap collection mechanism 90. The scrap collection mechanism 90 is disposed downstream of the second cutting mechanism 60, and the scrap collection mechanism 90 is configured to collect the scrap portion separated from the coated region 220.

Referring to FIG. 5, a die-cutting device 100 is provided according to an embodiment of the present application. The die-cutting device 100 comprises a conveying mechanism 10, a first cutting mechanism 20, a first limiting member 30, a second limiting member 40, a guide mechanism 50, a second cutting mechanism 60, a third limiting member 70, two dust removal mechanisms 80 and a scrap collection mechanism 90.

The first limiting member 30 and the second limiting member 40 are arranged opposite each other on two sides of an electrode plate in a thickness direction A, the first limiting member 30 is provided with a V-shaped first cutting hole 31, the first cutting mechanism 20 is disposed on the side of the first limiting member 30 that faces away from the electrode plate 200 in the thickness direction A of the electrode plate, the first cutting mechanism 20 is a laser light 300 cutting mechanism, and the laser light 300 emitted by the first cutting mechanism 20 passes through the first cutting hole 31 and cuts an uncoated region 210 of the electrode plate 200 such that the uncoated region 210 forms a scrap portion connected to the coated region 220 and a tab connected to the coated region 220 and separated from the scrap portion. The first limiting member comprises a first limiting portion 33, a first connecting portion 34 and a plurality of first rolling bodies 32, the first connecting portion 34 being connected to the first limiting portion 33 and located downstream of the first limiting portion 33, and the first rolling bodies 32 being rotatably connected to the first connecting portion 34.

The second cutting mechanism 60 and the guide mechanism 50 are both located downstream of the first cutting mechanism 20, and the second cutting mechanism 60, the guide mechanism 50, the third limiting member 70 and the first cutting mechanism 20 are located on the same side of the electrode plate in the thickness direction A. The second cutting mechanism 60 is configured to cut the scrap portion to separate the scrap portion from the coated region 220. The second cutting mechanism 60 is a laser light 300 cutting mechanism, and the guide mechanism 50 is an adsorption mechanism. The second limiting member 40 comprises a second limiting portion 43, a second connecting portion 44 and a plurality of second rolling bodies 42. The second connecting portion 44 is connected to the second limiting portion 43 and located downstream of the second limiting portion 43, the second rolling bodies 42 are rotatably connected to the second connecting portion 44, some of the second rolling bodies 42 are located downstream of the second cutting mechanism 60, and some of the second rolling bodies 42 are located upstream of the second cutting mechanism 60.

A plurality of through holes 71 are provided on the third limiting member 70, and the third limiting member 70 is configured to limit the coated region 220 in an offset direction of the scrap portion.

The two dust removal mechanisms 80 are respectively disposed on two sides of the electrode plate in the thickness direction A to form dust absorption by convection, so as to remove dust generated on the electrode plate 200 when the second cutting mechanism 60 cuts the scrap portion of the electrode plate 200.

The scrap collection mechanism 90 is disposed downstream of the second cutting mechanism 60 to collect the scrap portion separated from the coated region 220.

The foregoing descriptions are merely preferred embodiments of the present application, and are not intended to limit the present application. For those skilled in the art, various modifications and variations may be made to the present application. Any modifications, equivalent substitutions, improvements, and the like made within the spirit and principle of the present application should fall within the scope of protection of the present application.

What is claimed is:

1. A die-cutting device, comprising:
   a conveying mechanism configured to convey an electrode plate that comprises an uncoated region and a coated region, the uncoated region being connected to the coated region;
   a first cutting mechanism located on one side of the electrode plate in a thickness direction and configured to cut the uncoated region such that the uncoated region forms a scrap portion connected to the coated region and a tab connected to the coated region and separated from the scrap portion;
   a second cutting mechanism disposed on one side of the electrode plate in the thickness direction, disposed downstream of the first cutting mechanism, and configured to cut the scrap portion to separate the scrap portion from the coated region;
   a first limiting member located between the electrode plate and the first cutting mechanism in the thickness direction and provided with a cutting hole that allows laser light emitted by the first cutting mechanism to pass through, the cutting hole matching a cutting trajectory of the laser light;
   a second limiting member located on a side of the electrode plate that faces away from the first limiting member in the thickness direction, and configured to cooperate with the first limiting member to limit the electrode plate in the thickness direction; and
   a guide mechanism disposed downstream of the first limiting member and configured to drive the scrap portion to offset towards the second cutting mechanism.

2. The die-cutting device according to claim 1, wherein the first limiting member and the second limiting member at least partially overlap in the thickness direction to form an overlapping region, and the first cutting mechanism is configured to cut the uncoated region in the overlapping region.

3. The die-cutting device according to claim 1, wherein the first limiting member comprises a rolling body configured to abut against the uncoated region.

4. The die-cutting device according to claim 3, wherein the rolling body is disposed downstream of the first cutting mechanism.

5. The die-cutting device according to claim 3, wherein the first limiting member further comprises a limiting portion and a connecting portion, the rolling body being mounted on the connecting portion, and a surface of the first limiting member that faces the electrode plate being flush with an edge of the rolling body that is configured to abut against the uncoated region.

6. The die-cutting device according to claim 1, wherein the guide mechanism is an adsorption mechanism, and the guide mechanism is located on a same side as the second cutting mechanism in the thickness direction.

7. The die-cutting device according to claim 6, wherein the adsorption mechanism comprises an adsorption face provided with a plurality of adsorption holes.

8. The die-cutting device according to claim 1, wherein:
   the guide mechanism is located on a same side as the first limiting member in the thickness direction; and
   the second limiting member comprises a rolling body configured to abut against the uncoated region.

9. The die-cutting device according to claim 8, wherein the rolling body is one of a plurality of rolling bodies of the second limiting member that are located downstream of the first cutting mechanism, one or more of the plurality of rolling bodies being located upstream of the second cutting mechanism, and other one or more of the plurality of rolling bodies being located downstream of the second cutting mechanism.

10. The die-cutting device according to claim 8, wherein the second limiting member further comprises a limiting portion and a connecting portion, the rolling body being mounted on the connecting portion, and a surface of the second limiting portion that faces the electrode plate being flush with an edge of the rolling body that is configured to abut against the scrap portion.

11. The die-cutting device according to claim 1, further comprising:
   a third limiting member disposed on one side of the coated region in the thickness direction and configured to limit the coated region in an offset direction of the scrap portion.

12. The die-cutting device according to claim 11, wherein the third limiting member is provided with a plurality of through holes.

13. The die-cutting device according to claim 1, further comprising:
   a dust removal mechanism configured to remove dust generated on the electrode plate when the second cutting mechanism cuts the scrap portion of the electrode plate.

14. The die-cutting device according to claim 1, wherein the conveying mechanism comprises a first transmission roller and a second transmission roller, the first transmission roller and the second transmission roller cooperate to convey the electrode plate, and the first limiting member and the second limiting member are both located between the first transmission roller and the second transmission roller in a conveying direction of the electrode plate.

* * * * *